(12) United States Patent
Saitoh

(10) Patent No.: US 7,002,756 B2
(45) Date of Patent: Feb. 21, 2006

(54) VARIABLE FOCAL LENGTH LENS, PHOTOGRAPHING LENS UNIT, CAMERA, AND PORTABLE INFORMATION TERMINAL DEVICE

(75) Inventor: Takao Saitoh, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/882,363

(22) Filed: Jul. 2, 2004

(65) Prior Publication Data
US 2005/0002114 A1 Jan. 6, 2005

(30) Foreign Application Priority Data
Jul. 3, 2003 (JP) .............................. 2003-191519

(51) Int. Cl.
G02B 15/14 (2006.01)
(52) U.S. Cl. ...................................... 359/689; 359/680
(58) Field of Classification Search ........ 359/680–683, 359/689
See application file for complete search history.

(56) References Cited

U.S. PATENT DOCUMENTS 5,619,301 A 4/1997 Suzuki et al. ............... 396/114
6,308,011 B1 * 10/2001 Wachi et al. ................. 396/72
6,545,819 B1 * 4/2003 Nanba et al. ................ 359/689
6,744,564 B1 * 6/2004 Mihara et al. ............... 359/680
6,862,143 B1 * 3/2005 Hoshi et al. ................. 359/689

FOREIGN PATENT DOCUMENTS

| JP | 2003-35868 | 2/2003 |
| JP | 2003-107352 | 4/2003 |
| JP | 2003-131134 | 5/2003 |

* cited by examiner

*Primary Examiner*—Georgia Epps
*Assistant Examiner*—M. Hasan
(74) *Attorney, Agent, or Firm*—Oblon, Spivak, McClelland, Maier & Neustadt, P.C.

(57) ABSTRACT

A negative first group optical system, a positive second group optical system, and a positive third group optical system are sequentially arranged from the object side. A stop moving integrally with the second group optical system is provided on the object side of the second group optical system. The focal length is changed by changing distances between the group optical systems, and the third group optical system is moved on an optical axis. The first group optical system includes a negative meniscus lens, a negative meniscus lens, and a positive lens. The second group optical system includes a cemented lens of a positive lens and a negative lens, a positive lens, and a positive lens. The third group optical system includes one positive lens not including an aspherical surface.

14 Claims, 13 Drawing Sheets

VARIABLE FOCAL LENGTH LENS, PHOTOGRAPHING LENS UNIT, CAMERA, AND PORTABLE INFORMATION TERMINAL DEVICE

CROSS-REFERENCE TO RELATED APPLICATIONS

The present document incorporates by reference the entire contents of Japanese priority document, 2003-191519 filed in Japan on Jul. 3, 2003.

BACKGROUND OF THE INVENTION

1. Field of the Invention

The present invention relates to an improvement of a variable focal length lens such as a zoom lens that is used as a photographing optical system in various cameras including a so-called silver-salt camera. In particular, the present invention relates to a variable focal length lens that can be preferably used in cameras such as digital cameras and video cameras, and to a photographing lens unit, a camera, and a portable information terminal device that includes such a variable focal length lens.

2. Description of the Related Art

Recently, cameras such as digital cameras and electronic cameras have become common. Such a camera acquires a photograph of a subject image with a solid-state image pickup element such as a charge-coupled device (CCD) image pickup element to obtain image data of a still image or a moving image (movie image) and digitally records the image data in a nonvolatile semiconductor memory or the like. A flash memory is an example of the nonvolatile semiconductor memory. A traditional camera in which a conventional silver-salt film is used, that is, a silver-salt camera is gradually becoming outdated.

A market for such a digital camera has grown to be extremely large, and demands of users for the digital camera have been diversified. Above all, the users often demand for an improvement in image quality and miniaturization of the digital cameras.

To achieve the characteristics such as small size, light weight, and high performance, variable focal length lenses such as zoom lenses are often used in the digital cameras. Such a zoom lens generally has a two-lens group or three-lens group structure, i.e., a structure that includes only a few lenses. If the zoom lens includes lens groups having several lenses, when the lenses are moved in focusing, the advantage of miniaturization cannot be fully achieved, moreover, the operability become poor, because movement of a center of gravity of the lenses is large. Therefore, sometimes the focusing is performed by moving only some of the lens groups.

For example, zoom lenses have been disclosed in Japanese Patent Application Laid-Open Publication Nos. 2003-131134, 2003-107352, and 2003-35868 as zoom lenses that can be preferably used in digital cameras and are suitable for miniaturization. A typical zoom lens includes a first group optical system having a negative refracting power, a second group optical system having a positive refracting power, and a third group optical system having a positive refracting power. The first to the third group optical systems are sequentially arranged from an object side. A stop is provided on the object side of the second group optical system that moves integrally with the second group optical system. The focal length of the zoom lens can be changed by changing the distance between the respective group optical systems.

The first group optical system includes a negative meniscus lens, a negative meniscus lens, and a positive lens that are sequentially arranged from the object side. The second group optical system includes a positive lens, a negative lens, a positive lens, and a positive lens that are sequentially arranged from the object side. The third group optical system includes one positive lens.

In the zoom lens disclosed in Japanese Patent Application Laid-Open Publication No. 2003-131134, an image side surface of the negative meniscus lens second from the object side of the first group optical system, a surface on the most object side of the second group optical system, a surface on the most image side of the second group optical system, and a surface on the object side of the third group optical system are formed as aspherical surfaces, respectively.

In another exemplary structure, the positive lens on the most object side and the negative lens adjacent to the positive lens of the second group optical system are formed as a cemented lens, and an image side surface of the negative meniscus lens second from the object side of the first group optical system, a surface on the most object side of the second group optical system, a surface on the most image side of the second group optical system, and a surface on the object side of the third group optical system are formed as aspherical surfaces, respectively.

In still another exemplary structure, the positive lens on the most object side and the negative lens adjacent to the positive lens of the second group optical system are formed as a cemented lens, and an image side surface of the negative meniscus lens second from the object side of the first group optical system, a surface on the most object side of the second group optical system, and a surface on the object side of the third group optical system are formed as aspherical surfaces, respectively.

In still another exemplary structure, the negative lens and the negative lens second from the mage side adjacent to the negative lens of the second group optical system are formed as a cemented lens, and an image side surface of the negative meniscus lens second from the object side of the first group optical system, a surface on the most object side of the second group optical system, a surface on the most image side of the second group optical system, and a surface on the object side of the third group optical system are formed as aspherical surfaces, respectively.

In this way, in the technology disclosed in Japanese Patent Application Laid-Open Publication No. 2003-131134, the image surface is corrected by using the aspherical surface for the positive lens of the third group optical system. Japanese Patent Application Laid-Open Publication Nos. 2003-107352 and 2003-35868 disclose similar structures.

Thus, in the conventional technology, the image surface is corrected by using the aspherical surface for the positive lens of the third group optical system.

Although it is effective to use the aspherical surface for the third group optical system for correction of the image surface, deterioration of image performance due to the focusing occurs when the third group optical system is moved along an optical axis for focusing.

This point is explained in more detail below. When the third group optical system is used for focusing, it is necessary to secure an amount of movement of the third group optical system. For securing the amount of movement of the third group optical system, one approach is to increase the distance between the second and the third group optical systems or to increase a refracting power of the third group optical system to reduce the amount of movement of the third group optical system. However, the total length of the zoom lens increases and it becomes bulky if the distance between the second and the third group optical systems is increased. On the other hand, the aberration correction becomes difficult if the refracting power of the third group optical system is increased.

SUMMARY OF THE INVENTION

It is an object of the present invention to solve at least the problems in the conventional technology.

A variable focal length lens according to one aspect of the present invention includes a first group optical system having a negative refracting power, a second group optical system having a positive refracting power, and a third group optical system having a positive refracting power, wherein the first through the third group optical systems are sequentially arranged from an object side; and a stop provided on the object side of the second group optical system and that moves integrally with the second group optical system. A focal length is changed by changing distances between the first through the third group optical systems and when performing focusing the third group optical system is moved along an optical axis, the first group optical system includes a negative meniscus lens, a negative meniscus lens, and a positive lens those are sequentially arranged from the object side, at least one surface of the two negative meniscus lenses being an aspherical surface, the second group optical system includes a cemented lens of a positive lens and a negative lens, a positive lens, and a positive lens those are sequentially arranged from the object side, a surface on the object side of the positive lens on the most object side being an aspherical surface, and the third group optical system includes one positive lens not including an aspherical surface.

A variable focal length lens according to another aspect of the present invention includes a first group optical system having a negative refracting power, a second group optical system having a positive refracting power, and a third group optical system having a positive refracting power, wherein the first through the third group optical systems are sequentially arranged from an object side; and a stop provided on the object side of the second group optical system and that moves integrally with the second group optical system. A focal length is changed by changing relative distances between the first through the third group optical systems and when performing focusing the third group optical system is moved along an optical axis, the first group optical system includes a negative meniscus lens, a negative meniscus lens, and a positive lens those are sequentially arranged from the object side, the second group optical system includes a cemented lens of a positive lens and a negative lens, a positive lens, and a positive lens those are sequentially arranged from the object side, the third group optical system includes one positive lens, at least one surface of the negative meniscus lens in the first group optical system and a surface on the most object side in the second group optical system being aspherical surfaces, and the third group optical system includes only a spherical lens.

A photographing lens unit, a camera, a portable information terminal device according to still another aspect of the present invention include the above variable focal length lens according to the present invention.

The other objects, features, and advantages of the present invention are specifically set forth in or will become apparent from the following detailed description of the invention when read in conjunction with the accompanying drawings.

DETAILED DESCRIPTION

Figure 1:
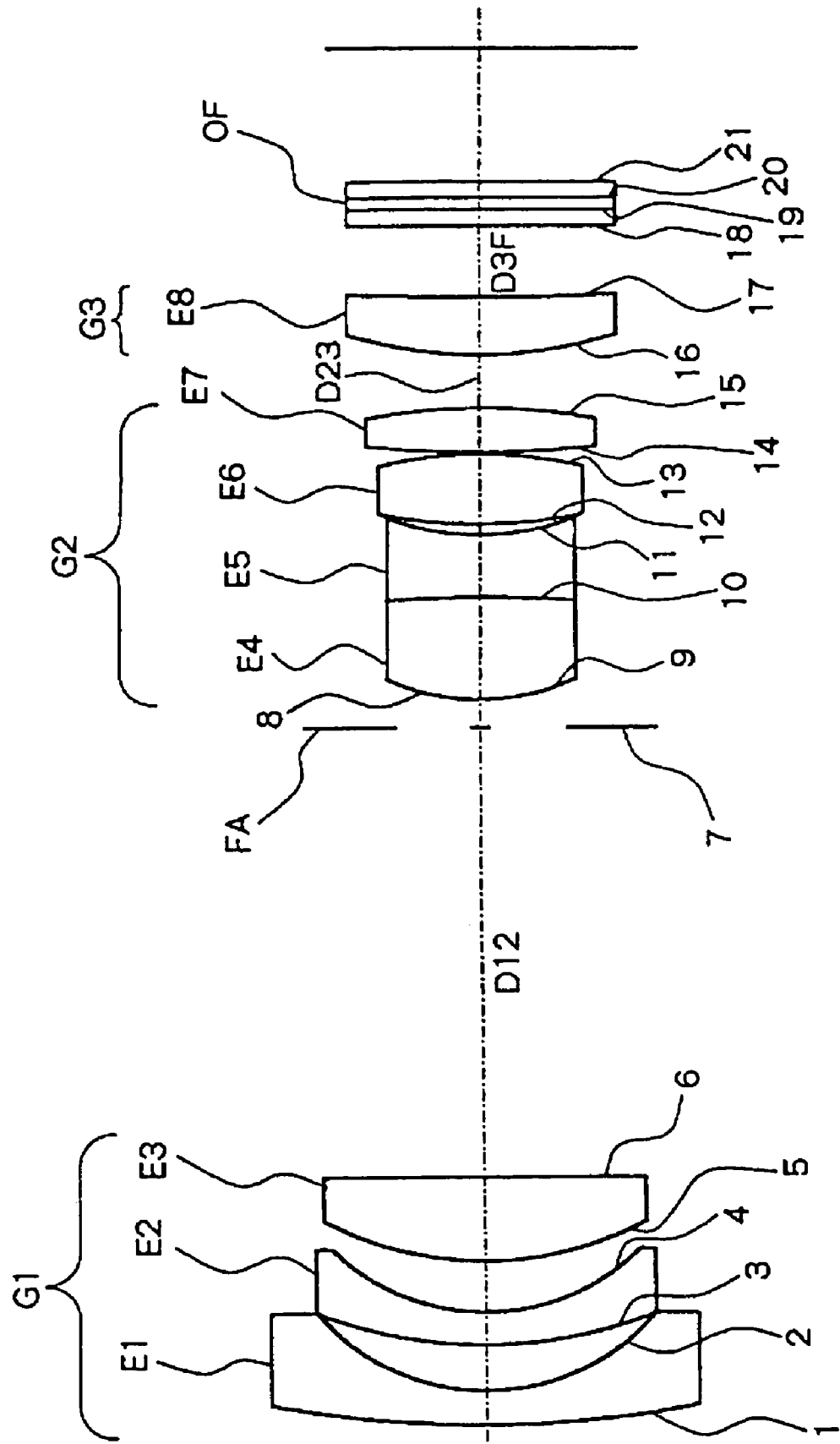
FIG. 1 is a side view of an optical system of a variable focal length lens according to a first embodiment of the present invention when the focal length is wide-angle end.

Exemplary embodiments of a variable focal length lens, a photographing lens unit, a camera, and a portable information terminal device of the present invention will be hereinafter explained in detail with reference to the accompanying drawings. The principle of the present invention will be explained first.

The variable focal length lens according to the present invention is, in general, a zoom lens. This variable focal length lens includes a first group optical system having a negative refracting power, a second group optical system having a positive refracting power, and a third group optical system having a positive refracting power that are sequentially arranged from an object side, and a stop provided on the object side of the second group optical system that moves integrally

TABLE 2

| Combination Number | Type of Information | | | |
|---|---|---|---|---|
| | (1) | (2) | ... | (k) |
| 1 | $y_{11}$ | $y_{12}$ | ... | $y_{1k}$ |
| 2 | $y_{21}$ | $y_{22}$ | ... | $y_{2k}$ |
| . | | | | |
| . | | | ... | |
| . | | | | |
| n | $y_{n1}$ | $y_{n2}$ | ... | $y_{nk}$ |

TABLE 2-continued

| Combination | Type of Information | | | |
|---|---|---|---|---|
| Number | (1) | (2) | ... | (k) |
| Average | 0 | 0 | ... | 0 |
| Standard Deviation | 1 | 1 | ... | 1 |

All correlation coefficients $r_{pq}(=r_{qp})$ between two combinations of data of k combinations of data are calculated using an expression (2), and are expressed by a matrix R (step 2-3). In addition, the inverse matrix of the matrix R of the correlation coefficients is calculated. The result obtained is expressed by a matrix A (step 2-4). "Σ" in the expression (2) indicates a summation related to a suffix i.

$$r_{pq} = r_{qp} = \frac{\sum (Y_{ip} Y_{iq})}{(\sum Y_{ip}^2 \sum Y_{iq}^2)^{1/2}} \quad (2)$$

Correlation Coefficient Matrix $$R = \begin{pmatrix} 1 & r_{12} & r_{13} & \cdots & r_{1k} \\ r_{21} & 1 & r_{23} & \cdots & r_{2k} \\ r_{31} & r_{32} & 1 & \cdots & r_{3k} \\ \vdots & \vdots & \vdots & \vdots & \vdots \\ r_{k1} & r_{k2} & r_{k3} & \cdots & 1 \end{pmatrix} \quad (3)$$

Inverse Matrix $$A = \begin{pmatrix} a_{11} & a_{12} & a_{13} & \cdots & a_{1k} \\ a_{21} & a_{22} & a_{23} & \cdots & a_{2k} \\ a_{31} & a_{32} & a_{33} & \cdots & a_{3k} \\ \vdots & \vdots & \vdots & \vdots & \vdots \\ a_{k1} & a_{k2} & a_{k3} & \cdots & a_{kk} \end{pmatrix} \quad (4)$$

With the calculations, the values of parameters calculated in a calculation expression, used when only the index value is calculated, is determined. Since all the data groups handled here express a normal state, it is considered that the various pieces of information acquired have a predetermined correlation. When the current state is far from the normal state and is likely to cause an abnormal state such as a failure, the correlations between the parameters are disturbed, and "distances" from original values (averages in a stable state) in the multi-dimensional spaces defined above increase. The distances represent the index values.

Figure 2:
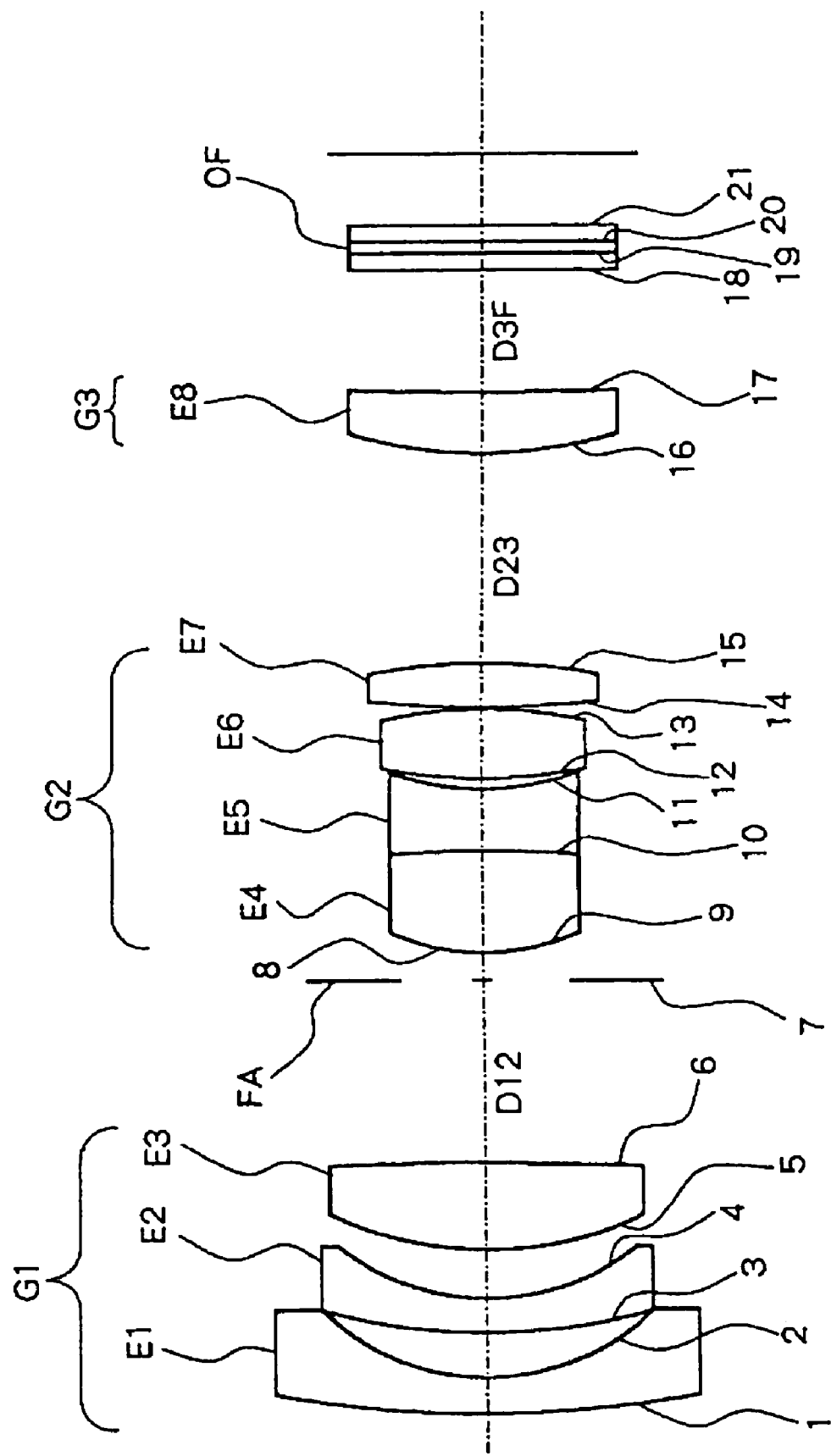
FIG. 2 is a side view of the optical system in FIG. 1 when the focal length is intermediate focal length.
Figure 4:
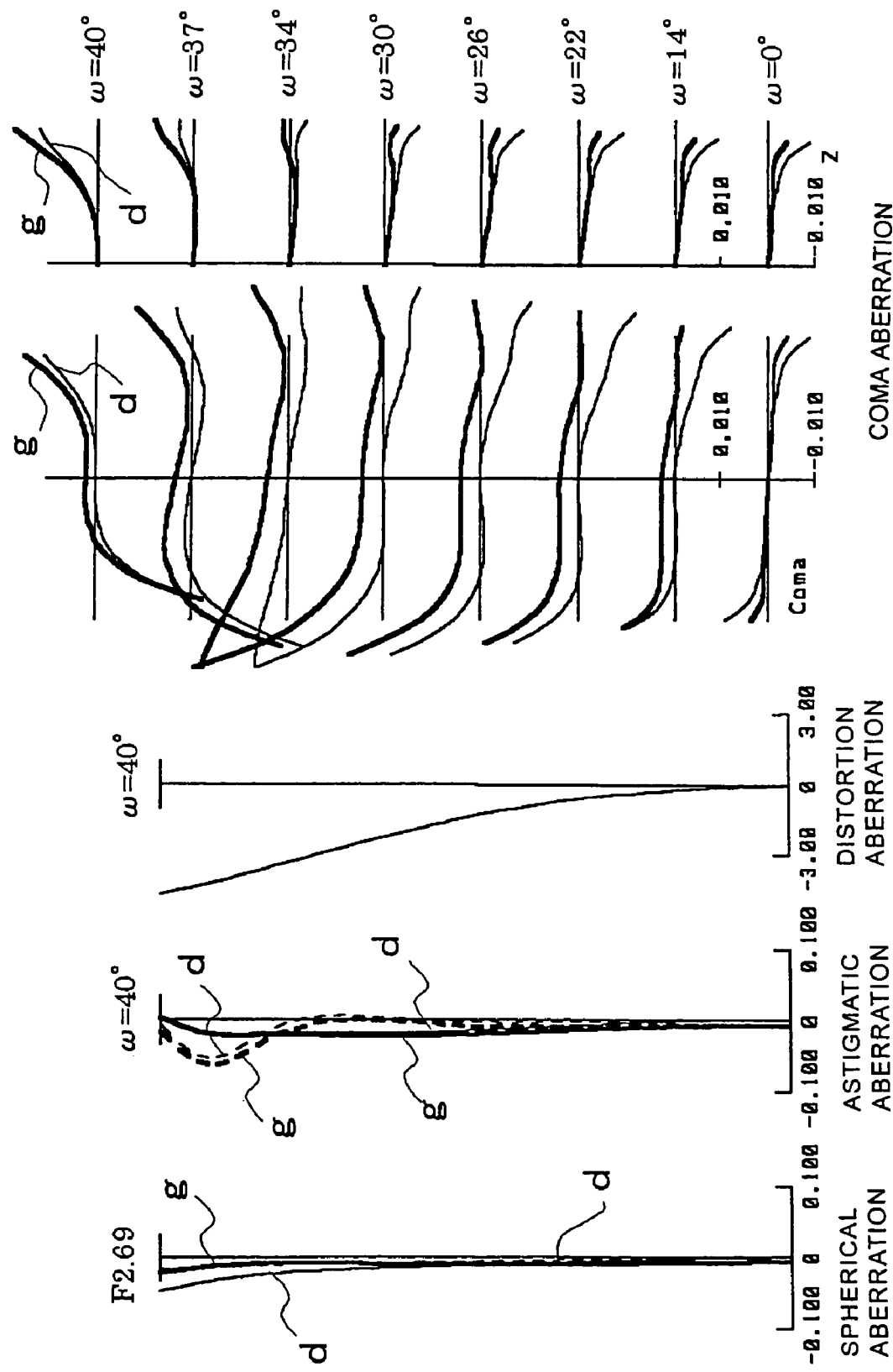
FIG. 4 is an aberration curve diagram showing various aberrations at the wide-angle end of the variable focal length lens in FIGS. 1 to 3.
Figure 5:
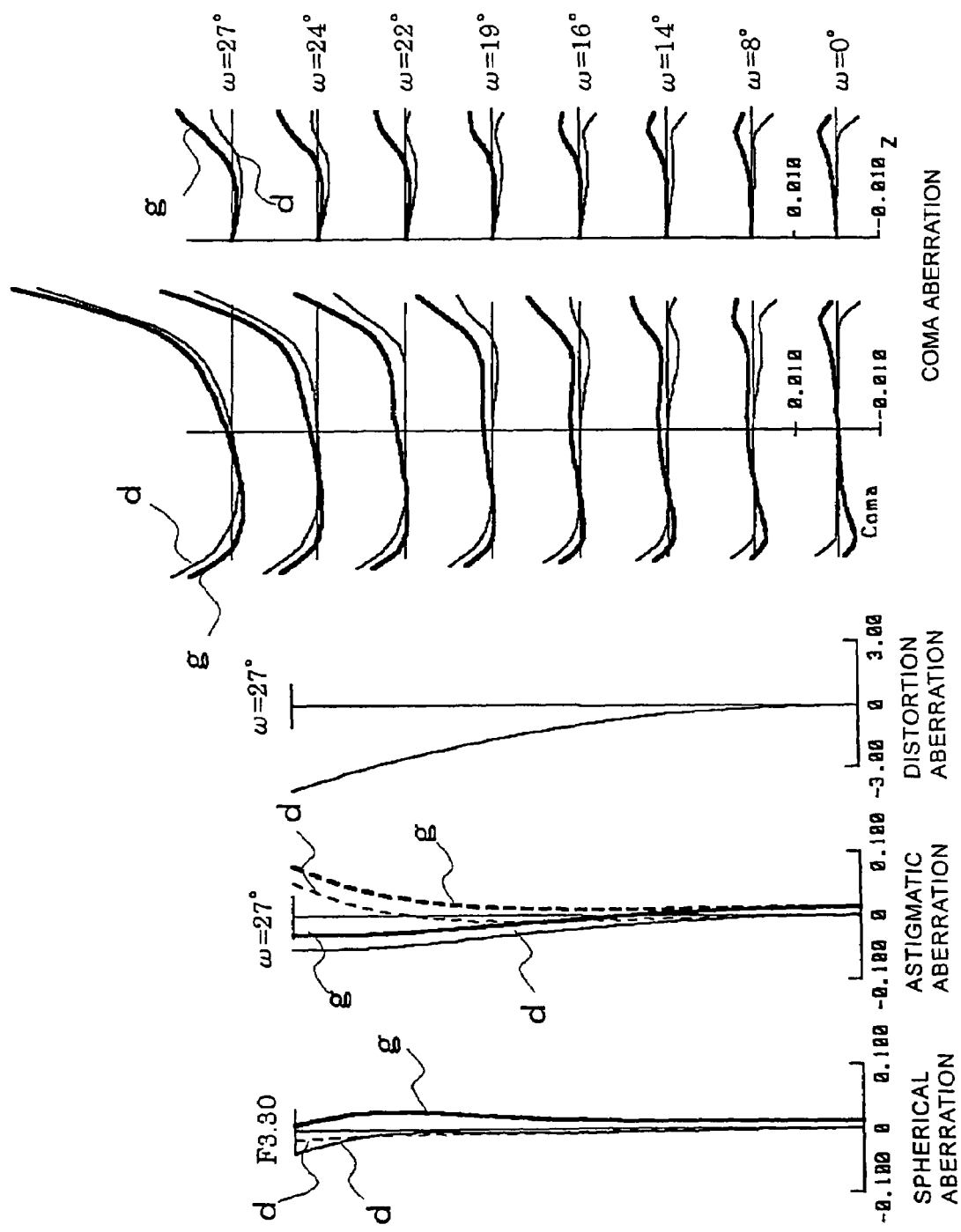
FIG. 5 is an aberration curve diagram showing various aberrations at the intermediate focal length of the variable focal length lens in FIGS. 1 to 3.

FIG. 4 is a flowchart of a procedure for calculating the index value in step 1-2 in FIG. 2. An index value at an arbitrary timing is calculated as follows. Data $x_1, x_2, \ldots, x_k$ of k types in an arbitrary state are acquired (step 3-1). The types of the data correspond to $y_{11}, y_{12}, \ldots, y_{1k}$ or the like. The information acquired is standardized using an expression (5) (step 3-2). In this case, the standardized data are defined as $X_1, X_2, \ldots, X_k$. A calculation expression (6) that is determined using elements $a_{kk}$ of the inverse matrix A, is used to calculate an index value $D^2$. A value D that is the square root of the index value is called "Mahalanobis's distance". "Σ" in the expression (6) indicates a summation related to the suffixes p and q.

$$X_j = (x_j - y_j)/\sigma_j \quad (5)$$

$$D^2 = (1/k) \Sigma a_{pq} X_p X_q \quad (6)$$

Figure 3:
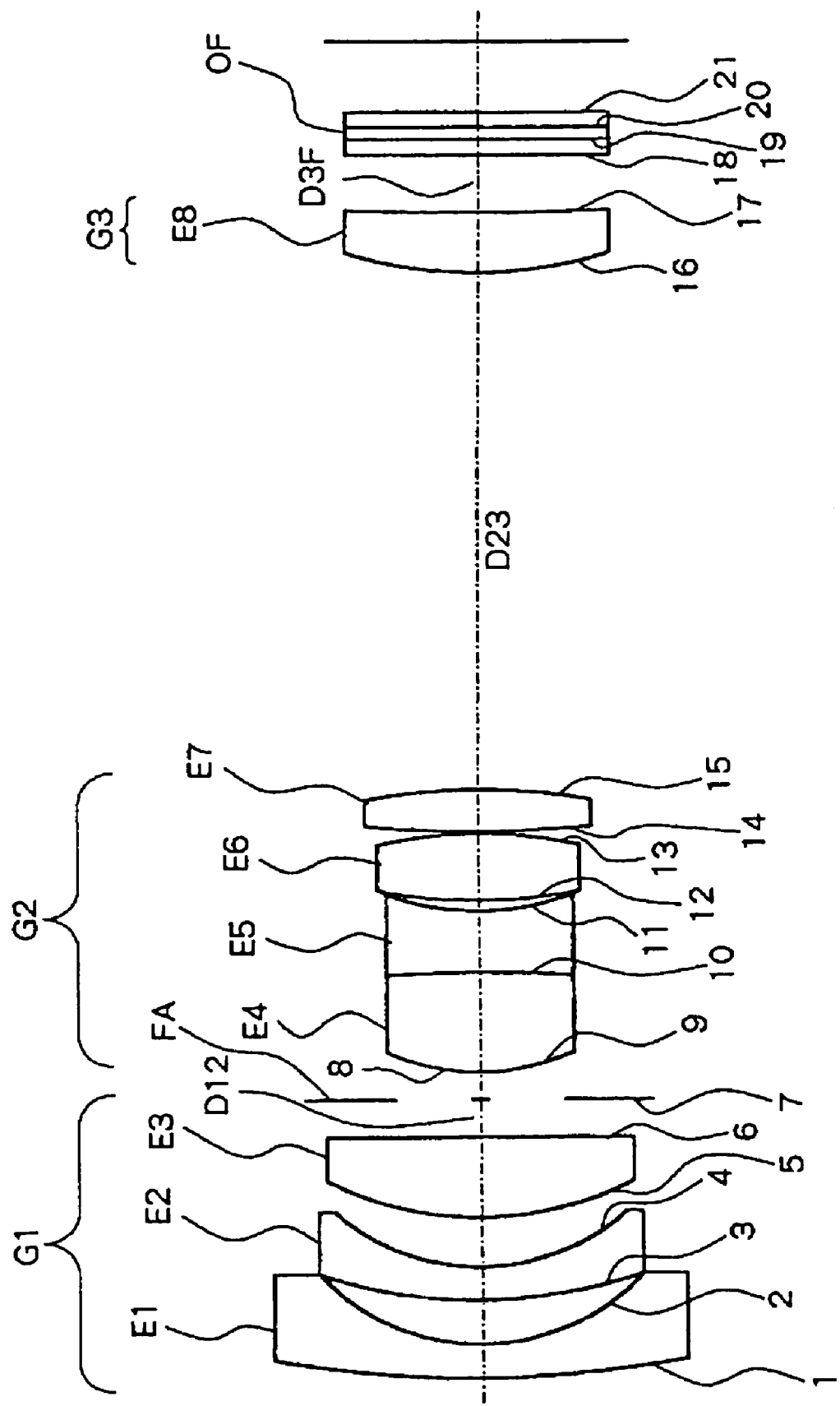
FIG. 3 is a side view of the optical system in FIG. 1 when the focal length is telescopic end.

The process of determining the calculation method for the index values includes determining the calculation expression for the index values and calculating the index value D using the calculation expression to update the index value D. This process may be continuously executed while the image forming system 6 is operated. In such case, the flow chart of the processes is obtained by combining the steps in FIG. 2 and those in FIG. 3.

Figure 6:
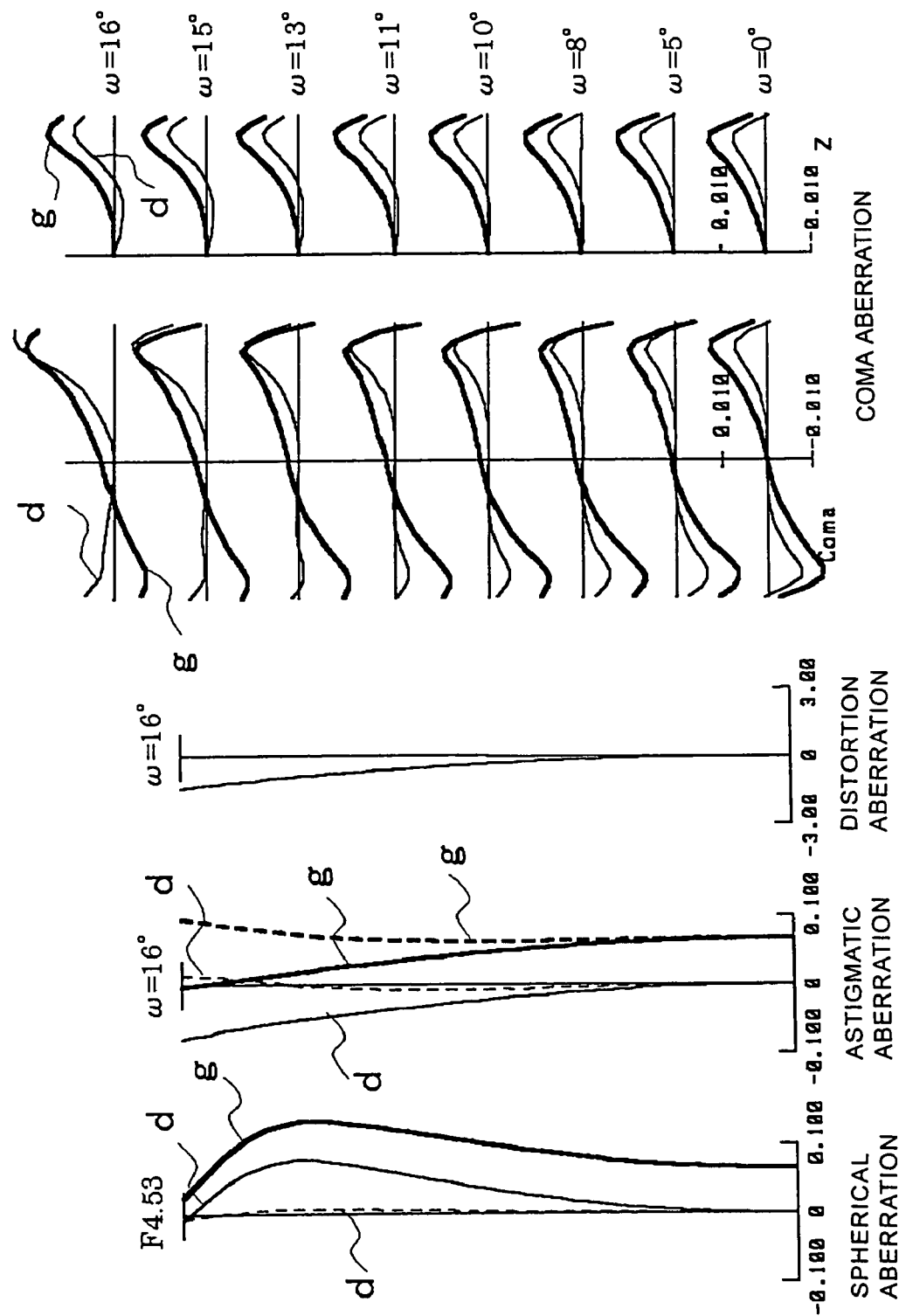
FIG. 6 is an aberration curve diagram showing various aberrations at the telescopic end of the variable focal length lens in FIGS. 1 to 3.

FIG. 6 illustrates a configuration of a color copying machine according to an embodiment of the present invention. The color copying machine serves as an image forming apparatus that uses an electronic photographing scheme. The image forming system 6 (see FIG. 1) serving as the image forming unit of the color copying machine includes a printer unit 100, a paper feeding unit 200, a scanner unit 300, and a original convey unit 400. The scanner unit 300 is fixed on the copying machine main body. An original convey unit 400 constituted by an original automatic convey device (ADF) is fixed on the scanner unit 300. In addition, the copying machine main body also includes the control unit 5 (see FIG. 1) that controls the operations of the various devices in the color copying machine. The control unit 5 includes a CPU, a RAM, a ROM, an I/O interface unit, and the like as described above.

In the scanner unit 300, a read sensor 36 reads the image information of an original document placed on a contact glass 32 and transmits the image information read to the control unit. A laser, an LED, or the like (not shown) is arranged in an exposure device 21 in the printer unit 100. The control unit controls the laser, the LED or the like, on the basis of the image information received from the scanner unit 300, to irradiate a laser write beam L on photosensitive drums 40Bk, 40Y, 40M, and 40C. With this irradiation, electrostatic latent images are formed on the surfaces of the photosensitive drums 40Bk, 40Y, 40M, and 40C, and the latent images are developed into toner images by a predetermined developing process.

In addition to the exposure device 21, the printer unit 100 includes a primary transfer device 62, a secondary transfer device 22, a fixing device 25, a delivery device, a toner supply device (not shown), and the like. The developing process will be described later in detail.

The paper feeding unit 200 includes paper feeding cassettes 44 held in a plurality of levels in a paper bank 43, a paper feeding roller 42 that forwards transfer paper P, which serves as a recording medium, from a paper feeding cassette, a separation roller 45 that separates the transfer paper P forwarded to send the transfer paper P along a paper feeding path 46, a convey roller 47 that conveys the transfer paper P to a feeding path 48 of the printer unit 100, and the like. In the apparatus according to the embodiment, in addition to the paper feeding unit 200, a manual paper feeding tray 51 that is used for feeding paper manually and a separation roller 52 that separates sheets of transfer paper P on the manual paper feeding tray one by one toward a manual paper feeding path 53, are arranged on a side surface of the apparatus. A resist roller 49 delivers only one sheet of transfer paper P placed on the paper feeding cassette 44 or the manual paper feeding tray 51, and sends the sheet of transfer paper to a secondary transfer nip portion located between an intermediate transfer belt 10 serving as an intermediate transfer body and the secondary transfer device 22.

In the configuration, when a color image is to be copied, an original document is set on an original table 30 of the original convey unit 400. Alternatively, the original convey unit 400 is opened to set the original document on the contact glass 32 of the scanner unit 300, and the original convey unit 400 is closed to press the original document. When a start switch (not shown) is pressed, the original document is conveyed onto the contact glass 32 if the original document is set on the original convey unit 400. On the other hand, if the original document is set on the contact glass 32, the scanner unit 300 is immediately driven to cause a first moving body 33 and a second moving body 34 to move. The first traveling body 33 reflects a beam from a light source, and a reflected beam from the surface of the original document is reflected to the second traveling body 34. The mirror of the second traveling body 34 reflects the beam and inputs the beam to the read sensor 36 through the image forming lens 35 to read image information. When the image information is received from the scanner unit, the laser writing and a developing process (to be described later) is performed to form toner images on the photosensitive drums 40Bk, 40Y, 40M, and 40C. At the same time, one of four resist-rollers is operated to feed the transfer paper P of a size depending on the image information read.

Accordingly, a drive motor (not shown) rotationally drives one of the support rollers 14, 15, and 16, that in turn rotate other two support rollers, and the intermediate transfer belt 10 is conveyed by the rotation of these rollers. At the same time, image forming units 18 rotate the photosensitive drums 40Bk, 40Y, 40M, and 40C to form single-color images of black, yellow, magenta, and cyan on the photosensitive drums 40Bk, 40Y, 40M, and 40C, respectively. With the conveyance of the intermediate transfer belt 10, these single-color images are sequentially transferred to form a synthesized color image on the intermediate transfer belt 10.

On the other hand, one of the paper feeding rollers 42 of the paper feeding unit 200 is selectively rotated to forward sheets of transfer paper P from one of the paper feeding cassettes 44. The separation roller 45 separates the sheets of transfer paper P and puts one sheet of transfer paper P at a time, into the feeding path 46. The convey roller 47 guides the sheet of transfer paper P to the feeding path 48 in the printer unit 100 and hits the sheet of transfer paper P against the resist roller 49 to stop the sheet of paper. Alternatively, a paper feeding roller 50 is rotated to forward sheets of transfer paper P on the manual paper feeding tray 51, separated by the separation roller 52, put into the manual paper feeding path 53, and hit against the resist roller 49 to stop the sheet of transfer paper P. The resist roller 49 is rotated at a timing matched with the timing when the synthesized color image is transferred on the intermediate transfer belt 10, and the sheet of transfer paper P is sent to the secondary nip portion that serves as a contact unit between the intermediate transfer belt and a secondary transfer roller 23. The color image is transferred by the influence of a transfer electric field and a contact pressure generated at the nip to record the color image on the sheet of transfer paper P.

The sheet of transfer paper P with the image is sent to the fixing device 25 over a convey belt 24 of the secondary transfer device. In the fixing device 25, a pressing roller 27 applies pressure and heat to the toner image to fix the toner image, and a delivery roller 56 delivers the sheet of transfer paper P onto a paper delivery tray 57.

The details of the printer unit 100 in the color copying machine according to the embodiment will be described below.

Figure 7:
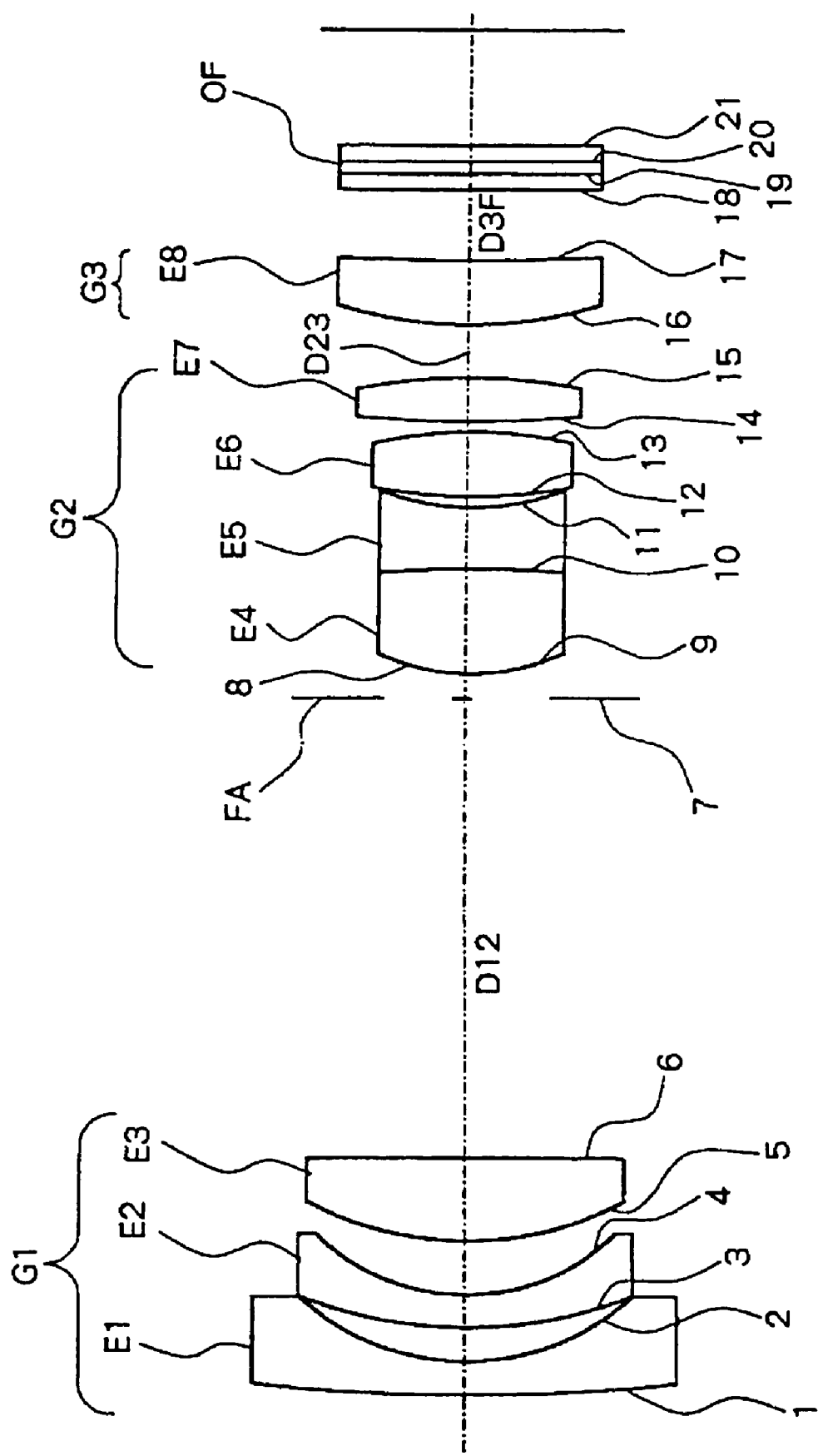
FIG. 7 is a side view of an optical system of a variable focal length lens according to a second embodiment of the present invention when the focal length is wide-angle end.

FIG. 7 is an enlarged view of a main part of the printer unit 100. The printer unit 100 includes an intermediate transfer belt 10 supported by three support rollers 14, 15, and 16, four photosensitive drums 40Bk, 40Y, 40M, and 40C serving as latent image carriers each of which carries a toner image of one of black, yellow, magenta, and cyan, and developing units 61Bk, 61Y, 61M, and 61C serving as developing units that form toner images on the drum surfaces. The printer unit 100 also includes photosensitive body cleaning devices 63Bk, 63Y, 63M, and 63C. Four image forming units 18Bk, 18Y, 18M, and 18C include the photosensitive drums 40Bk, 40Y, 40M, and 40C, the developing units 61Bk, 61Y, 61M, and 61C, and the photosensitive body cleaning devices 63Bk, 63Y, 63M, and 63C, respectively, and constitute a tandem image forming device 20. A belt cleaning device 17 removes residual toner remaining on the intermediate transfer belt 10 after a toner image is transferred to a sheet of transfer paper, and is arranged on the left of the support roller 15 in FIG. 7.

The belt cleaning device 17 has two fur brushes 90 and 91 as cleansing members. The fur brushes 90 and 91 ($\phi$20 millimeters) are made of acrylic carbon (6.25 D/F), having a resistance of $1\times10^7$, and planted at 0.1 million/inch$^2$. The fur brushes 90 and 91 are arranged to be into contact with the intermediate transfer belt 10 and rotated. A power supply (not shown) applies biases having different polarities to the fur brushes 90 and 91. Metal rollers 92 and 93 are brought into contact with the fur brushes 90 and 91, respectively, to make it possible to rotate the metal rollers 92 and 93 in a forward or backward direction with respect to the fur brushes.

In the embodiment, a power supply 94 applies a negative voltage to the metal roller 92 on the upstream side of the intermediate transfer belt 10 in the rotating direction, and a power supply 95 applies a positive voltage to the metal roller 93l on the downstream side. The distal ends of blades 96 and 97 are brought into press contact with the metal rollers 92 and 93, respectively. When the intermediate transfer belt 10 rotates in the direction shown by an arrow in FIG. 7, the fur brush 90 on the upstream side is used first, to apply, for example, a negative bias, to thereby clean the surface of the intermediate transfer belt 10. If a voltage of −700 volts is applied to the metal roller 92, the fur brush 90 has a voltage of −400 volts, and positively charged toner on the intermediate transfer belt 10 can be transferred to the side of the fur brush 90. The toner transferred to the fur brush side is transferred from the fur brush 90 to the metal roller 92 by a potential difference, and the blade 96 scrapes out the toner.

In this manner, the fur brush 90 removes the toner on the intermediate transfer belt 10. However, a large amount of toner still remains on the intermediate transfer belt 10. The toner is negatively charged by a negative bias applied by the fur brush 90. It is considered that the toner is charged by injection of electric charge or discharge. Therefore, a positive bias is applied next, using the fur brush 91, to clean the intermediate transfer belt 10, to remove the remaining toner. The removed toner is transferred from the fur brush 91 to the metal roller 93 by a potential difference, and the toner is scraped out by the blade 97. The toner scraped out by the blades 96 and 97 is recovered and put in a tank (not shown). The toner may be returned to the developing device 61 by using a toner recycle device (to be described later).

Thus, as described above, although most of the toner is removed from the surface of the intermediate transfer belt 10 by cleaning with the fur brush 91, a small amount of toner still remains on the surface. The toner remaining on the intermediate transfer belt 10 is positively charged by a positive bias applied to the fur brush 91. The positively charged toner is transferred to the photosensitive drums 40Bk, 40Y, 40M, and 40C by a transfer electric field applied at a primary transfer position, and can be recovered by the photosensitive body cleaning device 63.

A secondary transfer device 22 and the tandem image forming device 20 are arranged on the opposite sides of the intermediate transfer belt 10. The secondary transfer device 22 is constituted such that, in the embodiment, the convey belt 24 is hooked between the two rollers 23. The secondary transfer device 22 is brought into press contact with the third support roller 16 through the intermediate transfer belt 10 to form a secondary transfer nip portion, and a color toner image on the intermediate transfer belt 10 is secondarily transferred onto a sheet of transfer paper P. After the secondary transfer, the residual toner on the intermediate transfer belt 10 is removed by the belt cleaning device 17. The intermediate transfer belt 10 prepares for the next image formation. The secondary transfer device 22 also includes function to carry a sheet of transfer paper P, on which the image is transferred, to the fixing device 25. A transfer roller or a non-contact charger may be arranged as the secondary transfer device 22. However, in such a case, it is difficult for the secondary transfer device 22 to execute a function of carrying the transfer paper P.

Commonly, the resist roller 49 with earthing is used. However, a bias can also be applied to remove paper powder from the transfer paper P. For example, the bias may be applied via a conductive rubber roller. Conductive NBR rubber having a diameter of φ18 millimeters and a surface thickness of 1 millimeter is used as the material of the rubber roller. An electric resistance is a volume resistance of the rubber material, i.e., about $10 \times 10^9 \Omega \cdot cm$, and an application voltage of about −800 volts is applied to a side (front surface side) to which toner is transferred. A voltage of +200 volts is applied to the rear surface of the paper.

In a general intermediate transfer system, paper powder does not easily move to a photosensitive drum. Therefore, the necessity of considering transfer of paper powder is less, and the photosensitive drum may be grounded. A DC bias is applied as the application voltage. However, an AC voltage having a DC offset may be used to charge the sheet of transfer paper P more uniformly. The paper surface applied with the bias and passing through the resist roller 49 is slightly negatively charged. Therefore, in transfer from the intermediate transfer belt 10 to the sheet of transfer paper P, the transfer conditions are different from those set when no voltage is applied to the resist roller 49, and the transfer conditions may be changed.

In the embodiment, a transfer paper reversing device 28 (see FIG. 6) that is arranged in parallel to the tandem image forming device 20, reverses the sheet of transfer paper P to record images on both the surfaces of the sheet of transfer paper P. In this manner, after the image is fixed on one surface of the sheet of transfer paper, the course of the sheet of transfer paper is switched to the transfer paper reversing device side by a switching pawl. At this position, the sheet of transfer paper is reversed, and the toner image is transferred by the secondary transfer nip again. Thereafter, the sheet of transfer paper P may be delivered on the paper delivery tray.

The tandem image forming device 20 will be described below.

Figure 8:
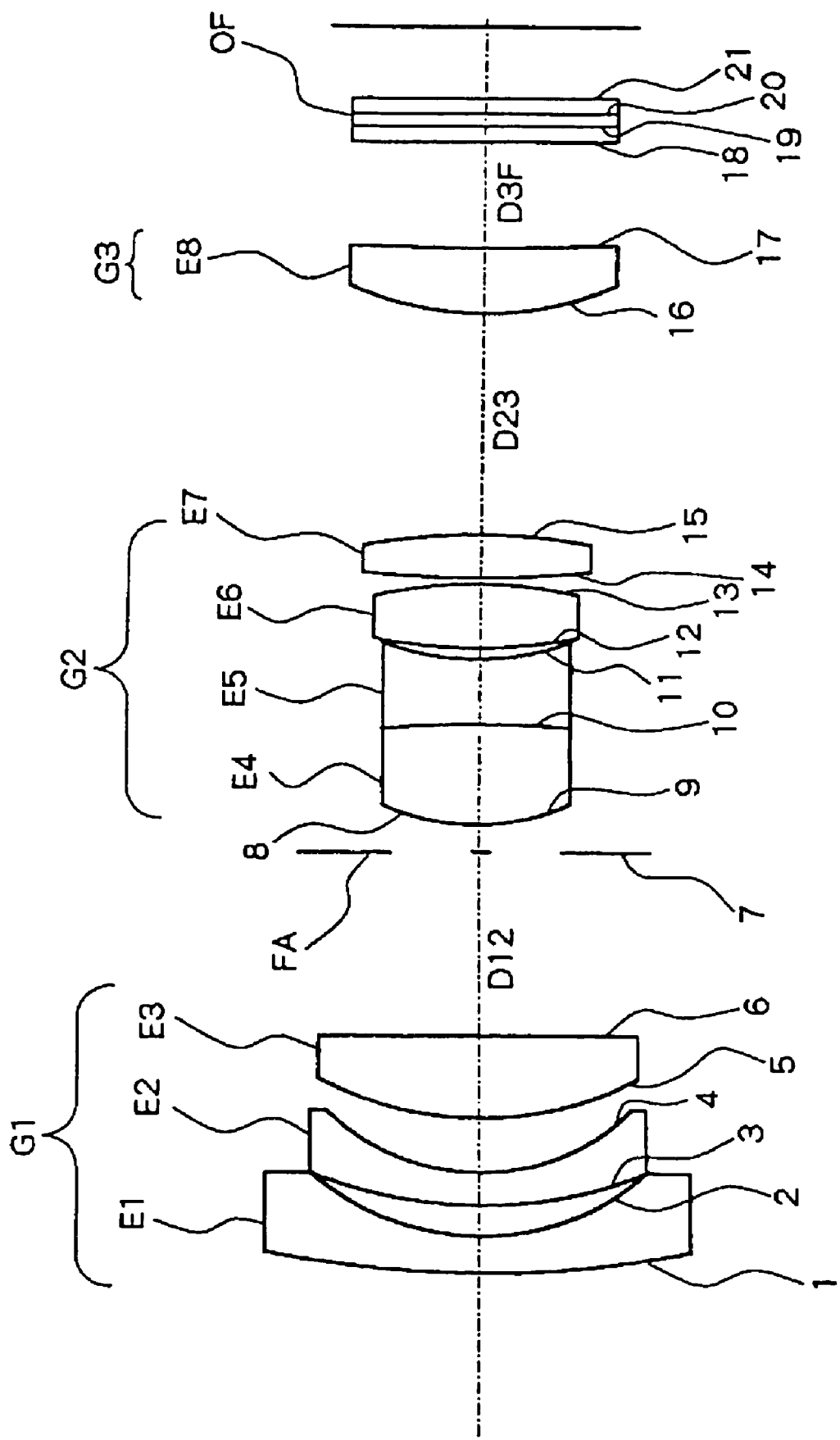
FIG. 8 is a side view of the optical system in FIG. 7 when the focal length is intermediate focal length.
Figure 9:
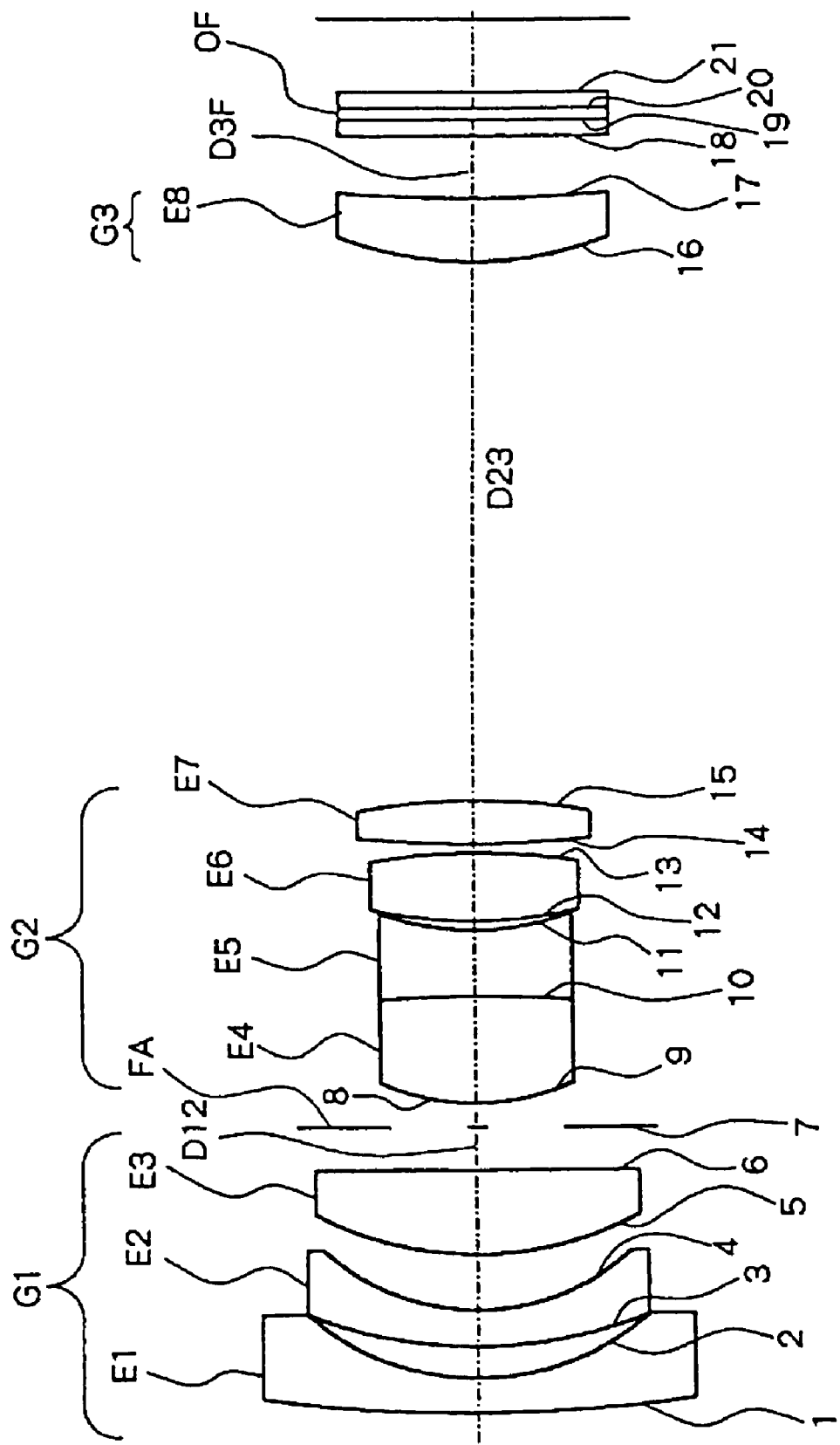
FIG. 9 is a side view of the optical system in FIG. 7 when the focal length is telescopic end.
Figure 10:
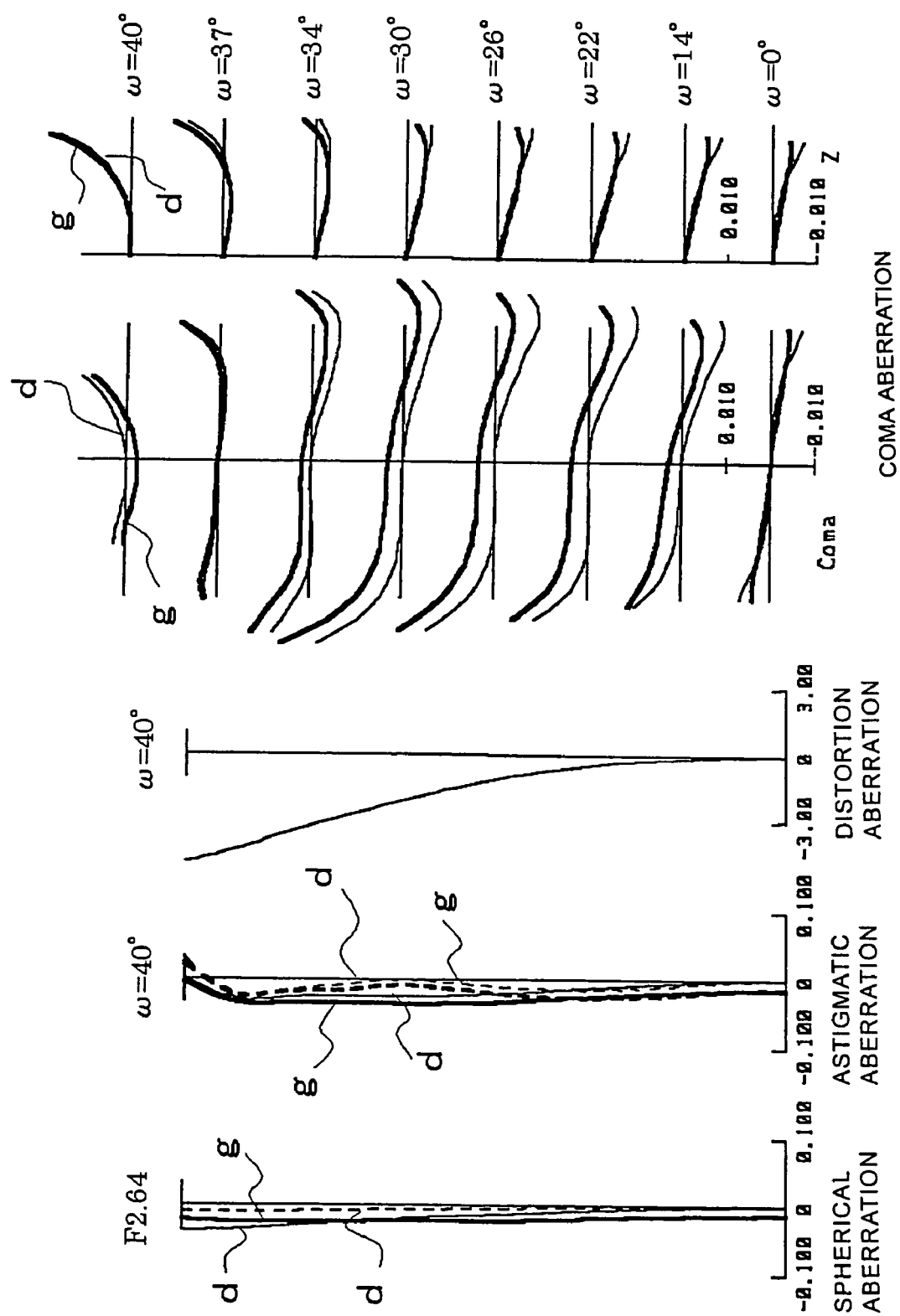
FIG. 10 is an aberration curve diagram showing various aberrations at the wide-angle end of the variable focal length lens in FIGS. 7 to 9.
Figure 11:
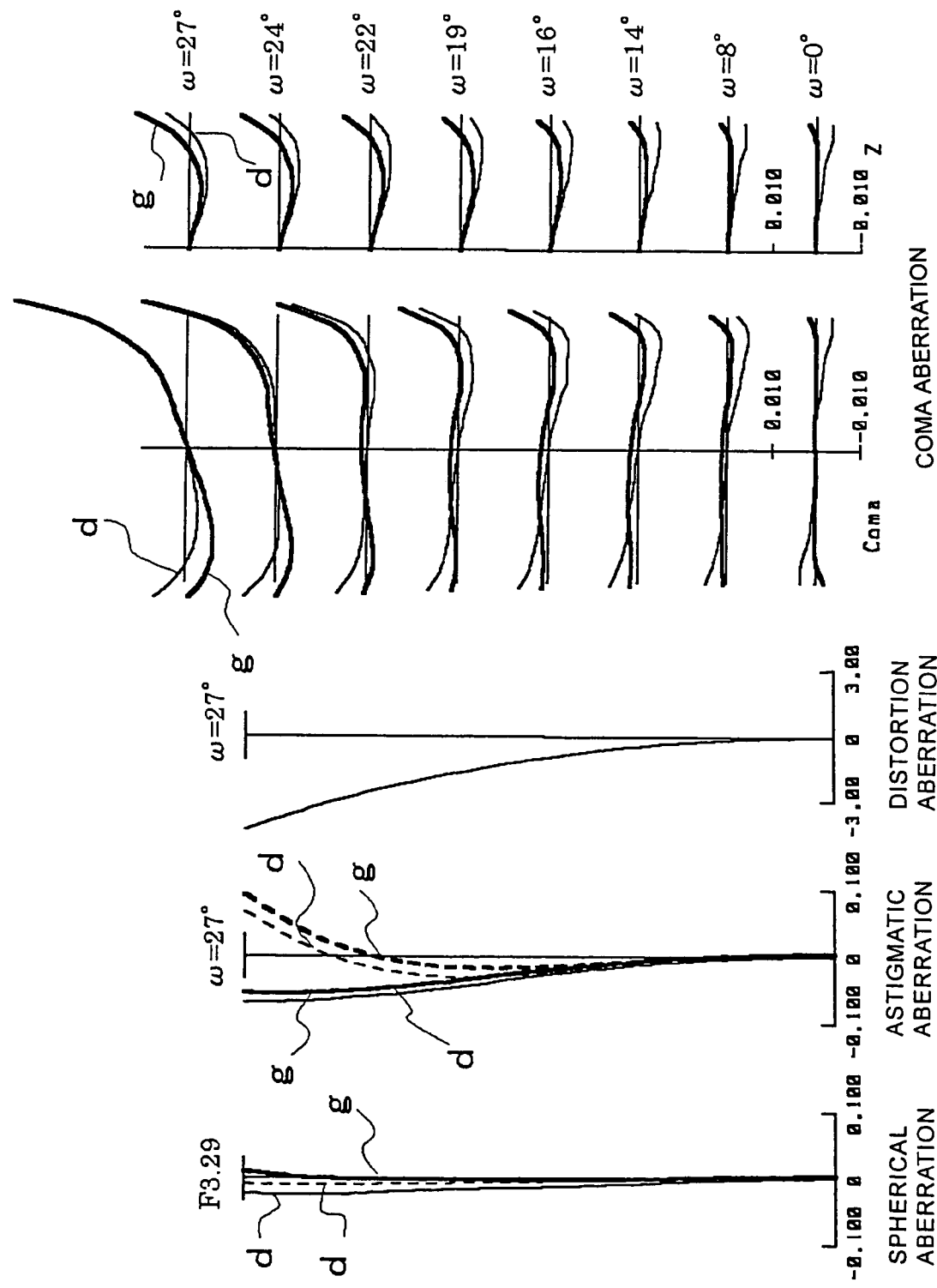
FIG. 11 is an aberration curve diagram showing various aberrations at the intermediate focal length of the variable focal length lens in FIGS. 7 to 9.
Figure 12:
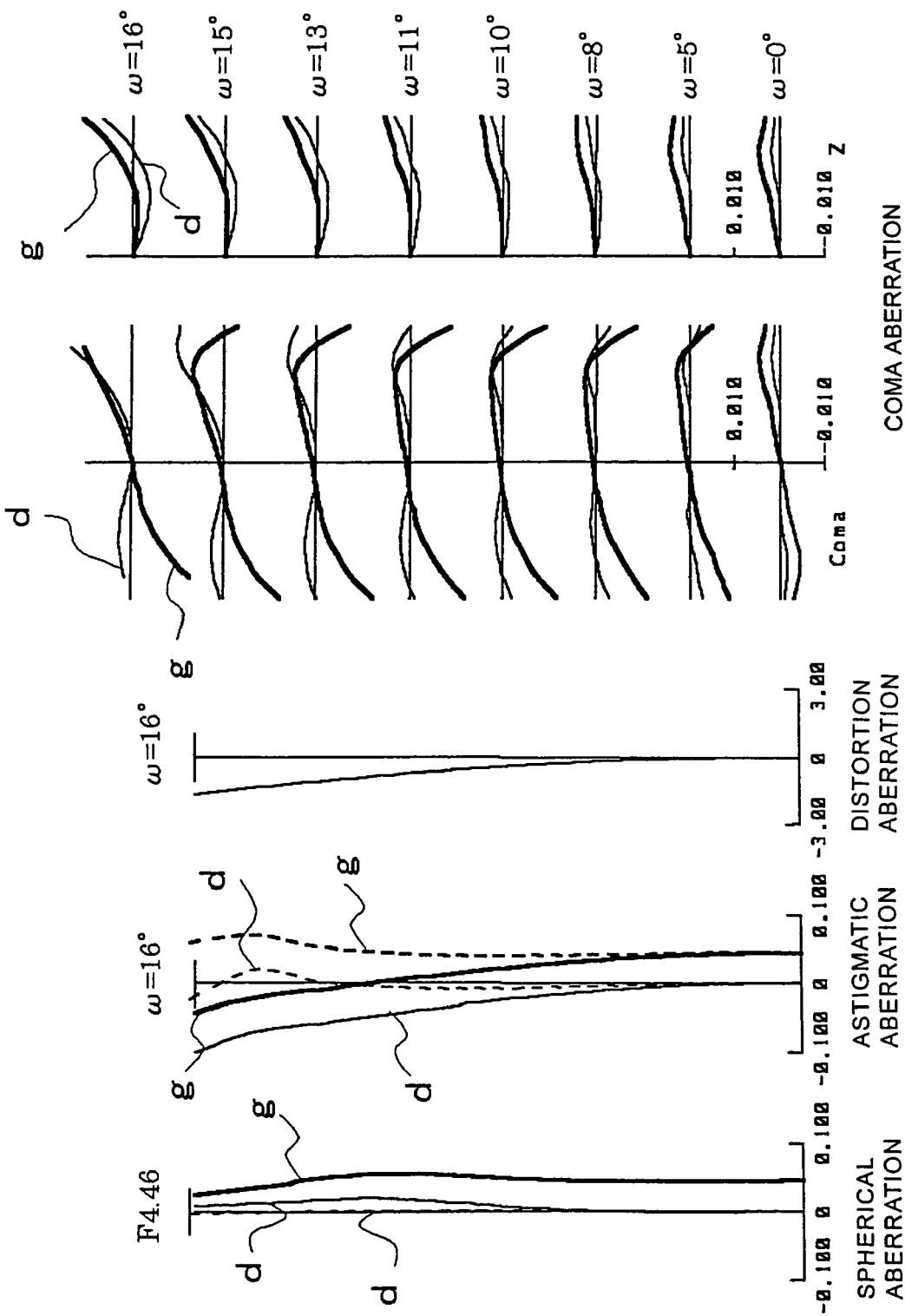
FIG. 12 is an aberration curve diagram showing various aberrations at the telescopic end of the variable focal length lens in FIGS. 7 to 9.
Figure 13:
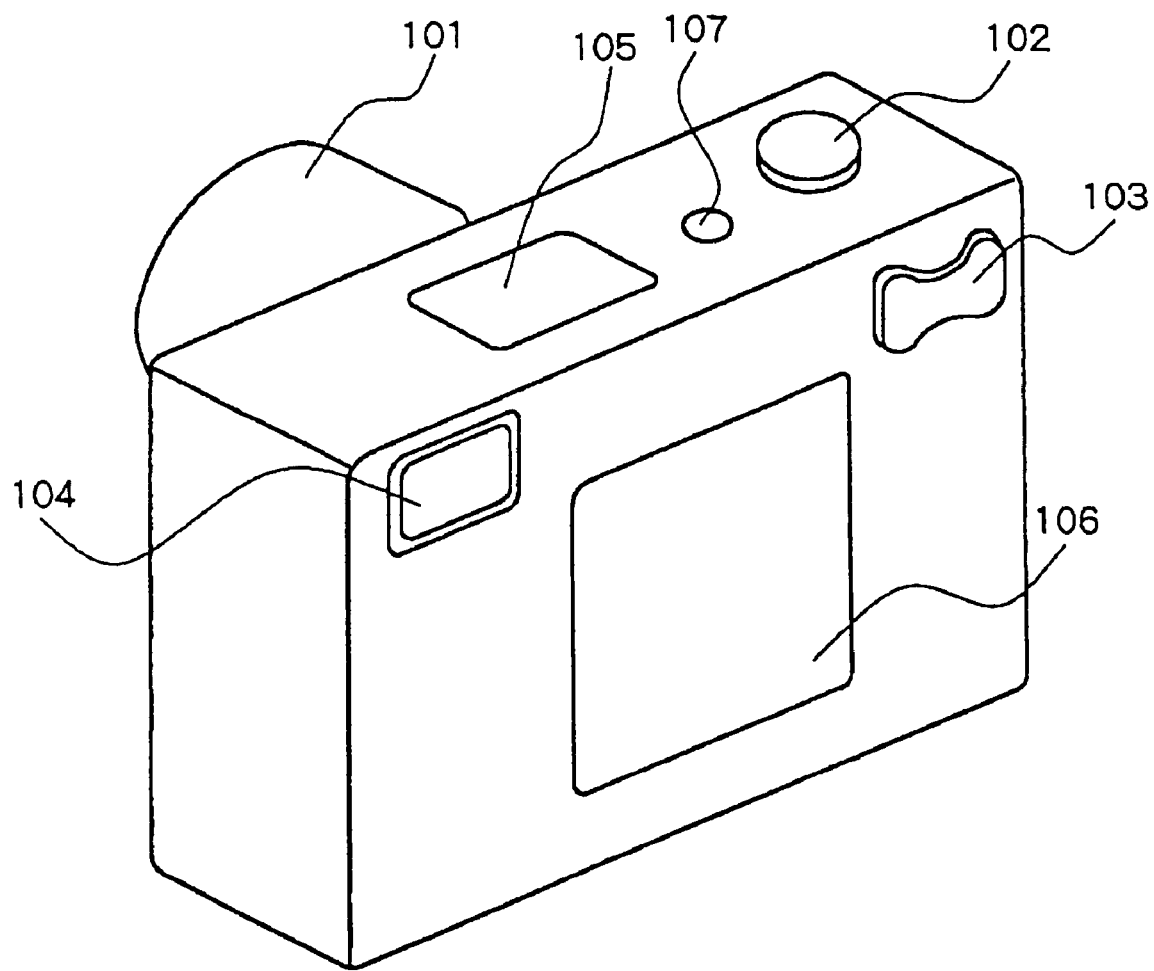
FIG. 13 is a perspective view from a photographer side schematically showing an external structure of a camera according to a third embodiment of the present invention.

FIG. 8 is a partially enlarged view of the tandem image forming device 20. The four image forming units 18Bk, 18Y, 18M, and 18C have identical configurations, and hence, the four color symbols Bk, Y, M and C are omitted in the description that follows. The configuration of one of the units will be described in detail. As shown in FIG. 8, in the image forming unit, a charging device 60, a developing device 61, a primary transfer device 62, a photosensitive body cleaning device 63, an ionizer 64, and the like are arranged around the photosensitive drums 40Bk, 40Y, 40M, and 40C. Each of the photosensitive drums 40Bk, 40Y, 40M, and 40C, is formed by coating an organic photosensitive material on a material tube consisting of aluminum or the like to form a photosensitive layer. Alternatively, photosensitive drums 40Bk, 40Y, 40M, and 40C may be constituted by endless belts.

Although not shown, at least photosensitive drums 40Bk, 40Y, 40M, and 40C are arranged, and a process cartridge is constituted by including all or some of the units in the image forming unit 18. The image forming units 18 may be detachably arranged in the printer unit 100 at once to improve the maintenance properties. Of the units constituting the image forming units 18, the charging device 60 is in the form of a roller in the shown example and brought into contact with the photosensitive drums 40Bk, 40Y, 40M, and 40C to apply a voltage, to charge the photosensitive drums 40Bk, 40Y, 40M, and 40C. Alternatively, a non-contact Scorotron charger may also be used for charging the photosensitive drums.

A one-component developing agent may be used as the developing device 61. However, in the example shown, a two-component developing agent consisting of a magnetic carrier and non-magnetic toner is used. A stirring unit 66 conveys the two-component developing agent while stirring the two-component developing agent, supplies the two-component developing agent to a developing sleeve 65, and causes the two-component agent to adhere to the developing sleeve 65. A developing unit 67 transfers the toner of the two-component agent adhering the developing sleeve 65 to the photosensitive drums 40Bk, 40Y, 40M, and 40C. The stirring unit 66 is located at a level lower than that of the developing unit 67.

The stirring unit 66 has two parallel screws 68. A partition plate 69 partitions the two screws 68 in regions other than both the end portions. A toner concentration sensor 71 is arranged in a developing case 70.

In the developing unit 67, the developing sleeve 65 is arranged in opposition to the photosensitive drums 40Bk, 40Y, 40M, and 40C through an opening of the developing case 70, and a magnet 72 is fixed in the developing sleeve 65. A doctor blade 73 is arranged such that the distal end of the doctor blade 73 is close to the developing sleeve 65. In the example shown, an interval between the doctor blade 73 and the developing sleeve 65 at the closest portion is set to 500 micrometers.

The developing sleeve 65 is a non-magnetic rotatable sleeve. A plurality of magnets 72 are arranged in the developing sleeve 65. The magnet 72 is designed to cause magnetic force to act when the developing agent passes through a predetermined position. In the example shown, the diameter of the developing sleeve 65 is set to φ18 millimeters, and the surface of the developing sleeve 65 is subjected to a sandblast process or a process of forming a plurality of grooves each having a depth of 1 to several millimeters, so that a surface roughness (Rz) falls within the range of 10 to 30 micrometers.

The magnet 72 has five polarities N1, S1, N2, S2, and S3 in a direction from the position of the doctor blade 73 in the rotating direction of the developing sleeve 65. A magnetic brush, made of the developing agent and magnetized by the magnet 72, is supported on the developing sleeve 65. The developing sleeve 65 is arranged in opposition to the photosensitive drums 40Bk, 40Y, 40M, and 40C in a region on S1 side of the magnet 72 that forms the magnetic brush for the developing agent.

With such configuration, the two-component developing agent is conveyed and circulated while being stirred by the two screws 68, and is supplied to the developing sleeve 65. The developing agent supplied to the developing sleeve 65 is scooped up and held by the magnet 72 to form a magnetic brush on the developing sleeve 65. The magnetic brush is thinned by the doctor blade 73 to have an appropriate amount with rotation of the developing sleeve 65. The cut developing agent is returned to the stirring unit 66.

The toner of the developing agent supported on the developing sleeve 65 is transferred to the photosensitive drums 40Bk, 40Y, 40M, and 40C by applying a developing bias voltage to the developing sleeve 65 to change the electrostatic latent images on the photosensitive drums 40Bk, 40Y, 40M, and 40C into visible images. After the visible images are formed, a developing agent remaining on the developing sleeve 65 is separated from the developing sleeve 65 out of the magnetic force of the magnet 72, and returned to the stirring unit 66. As the operations are repeated, the toner concentration in the stirring unit 66 decreases. The toner concentration sensor 71 detects the toner concentration, and toner is supplied to the stirring unit 66.

In the apparatus according to the embodiment, the following settings of the units are made. The linear velocity of each of the photosensitive drums 40Bk, 40Y, 40M, and 40C is set at 200 mm/s. The linear velocity of the developing sleeve 65 is set at 240 mm/s. The diameter of each of the photosensitive drums 40Bk, 40Y, 40M, and 40C is set at 50 millimeters, and the diameter of the developing sleeve 65 is set at 18 millimeters. The developing process is performed with these settings. An amount of charge of toner on the developing sleeve 65 preferably falls within the range of −10 to −30 $\mu C/g$. A developing gap GP, that is, each of gaps between the photosensitive drums 40Bk, 40Y, 40M, and 40C and the developing sleeves 65 can be set to fall within the range of 0.8 millimeter to 0.4 millimeter as in a conventional art. Reducing the developing gap GP improves the developing efficiency. In addition, the thickness of the photosensitive body 40 is set at 30 micrometers, the beam spot diameter of an optical system is set at 50 to 60 micrometer, and light intensity is set at 0.47 mW. A charging potential before exposure V0 of the photosensitive body 40 is set at −700 volts, potential after exposure VL is set at −120 volts, and a developing bias potential is set at −470 volts, i.e., a developing potential is 350 volts. A developing process is performed with these settings.

The roller-shaped primary transfer roller 62 is arranged to be in press contact with the photosensitive body 40 through the intermediate transfer belt 10. An electric conductive roller 74 is arranged between the primary transfer devices 62 such that the electric conductive roller 74 is brought into contact with a base layer 11 of the intermediate transfer belt 10. The image forming units 18 are adjacent to the primary transfer devices 62. Therefore, the electric conductive roller 74 prevents biases, applied by the primary transfer devices 62 in transfer, from flowing in the image forming units 18 through the base layer 11 having an intermediate resistance.

A cleaning blade 75 is made of polyurethane rubber. The photosensitive body cleaning device 63 brings the distal end of the cleaning blade 75 into press contact with the photosensitive body 40. In addition, a fur brush 76, having contact conductivity and an external periphery being in contact with the photosensitive body 40, is rotatably arranged in the direction of an arrow shown in FIG. 8, to thereby improve cleaning properties. A metal electric field roller 77 applies a bias to the fur brush 76, and is arranged such that the metal electric field roller 77 can be rotated in the direction of the arrow shown. The distal end of a scraper 78 is brought into press contact with the metal electric field roller 77. A recovery screw 79 that recovers the removed toner is also arranged in the photosensitive body cleaning device 63.

In the photosensitive body cleaning device 63 with such configuration, the fur brush 76 that rotates in the direction opposite to that of the photosensitive body 40 removes residual toner on the photosensitive body 40. The electric field roller 77 that is in contact with the fur brush 76, applies a bias, and rotates in the direction opposite to that of the fur brush 76, to thereby remove the toner adhering to the fur brush 76. The scraper 78 cleans the electric field roller 77 and removes the toner adhering to the electric field roller 77. The recovery screw 79 collects the toner, recovered by the photosensitive body cleaning device 63, on one side of the photosensitive body cleaning device 63. A toner recycle device 80 returns the toner collected to the developing device 61, and recycles the toner returned.

The ionizer 64 uses an ionizing lamp to irradiate a beam on the photosensitive drum 40, to thereby initialize the surface potential of the photosensitive drum 40.

The image forming process, in the tandem image forming device 20 with the above configuration, is performed as follows. With rotation of the photosensitive drum 40, the charging device 60 uniformly charges the surface of the photosensitive drum 40, and a write beam L is irradiated on the photosensitive drum 40 to form an electrostatic latent image on the photosensitive drum 40. Thereafter, the developing device 61 performs developing to cause the toner to adhere to the electrostatic latent image, and forms a toner image. The primary transfer device 62 primarily transfers the toner image onto the intermediate transfer belt 10. The photosensitive body cleaning device 63 removes residual toner from the surface of the photosensitive drum 40 after the image transfer, and the ionizer 64 ionizes the surface to prepare image formation again. On the other hand, the residual toner removed from the surface of the photosensitive drum is re-used in developing by a toner recycle device (to be described later). An order of colors forming an image is not limited to the order described above. The order changes depending on objects or characteristics held in the image forming apparatus.

The type of information to be acquired for predicting occurrence of an abnormal state in the color copying machine having the above configuration and an acquiring method will be described below.

(a) About Sensing Information

A drive relationship, various characteristics of a recording medium, characteristics of a developing agent, characteristics of a photosensitive body, various process states of an electronic photograph, an environmental condition, various characteristics of a recording object, and the like are considered as the sensing information to be acquired. The outline of the pieces of sensing information will be described below.

(a-1) Information of Drive

A rotating speed of a photosensitive drum is detected by an encoder, a current value of a drive motor is read, and a temperature of the drive motor is read.

Similarly, drive states of cylindrical or belt-like rotatable units such as a fixing roller, a paper convey roller, and a drive roller are detected.

A microphone installed inside or outside the apparatus detects the sound generated by a drive.

(a-2) State of Paper Conveyance

The positions of the front and rear ends of conveyed paper are read by a transmissive or reflective photo-sensor or a contact type sensor, to detect occurrence of paper jam or to read a difference between pass timings of the front and rear ends of the sheet of paper and a change of a direction vertical to a transmission direction.

Similarly, on the basis of the timings detected by the sensors, a moving speed of the sheet of paper is calculated.

Slit between a paper feed roller and a sheet of paper in paper feeding is calculated by comparing a value obtained by measuring a rotating speed of the roller with a moving distance of the sheet of paper.

(a-3) Various Characteristics of Recording Medium Such As Paper

This information considerably affects image quality and the stability of paper conveyance. The information about the paper is acquired by the following methods.

The thickness of the sheet of paper is calculated by the following method. The sheet of paper is pinched by two rollers, relative displacements of the roller are detected by an optical sensor, or a displacement which is equal to a moving distance of a member lifted up by insertion of the sheet of paper is detected.

The surface roughness of the sheet of paper is calculated by the following method. A guide or the like is brought into contact with the surface of the sheet of paper before transfer, and vibration, sliding sound, or the like generated by the contact is detected.

The gloss of the sheet of paper is calculated by the following method. A light flux having a predetermined open angle is incident at a predetermined incident angle. The light flux reflected in a reflecting direction of a mirror surface and having a predetermined open angle, is measured by a sensor.

The rigidity of the sheet of paper is calculated by detecting a transformation ratio (curvature) of the pressed sheet of paper.

To decide whether the paper is a sheet of recycled paper, an ultraviolet ray is irradiated on the sheet of paper and the transmittance of the sheet of paper is detected.

To decide whether the paper is a sheet of backing paper, a beam is irradiated from a linear beam source such as an LED array, and a beam reflected from a transfer surface is detected by a solid-state image pickup element such as a CCD.

To decide whether the paper is a sheet of paper for OHP, a beam is irradiated on the sheet of paper to detect a regularly reflected beam having an angle different from that of a transmitted beam.

Moisture content of the sheet of paper is calculated by measuring absorption of infrared or a $\mu$-wave beam.

A photo-sensor, a contact sensor, or the like detects an amount of curl.

An electric resistance of the sheet of paper is obtained by the following method. A pair of electrodes (paper feeding rollers or the like) is brought into contact with a sheet of recording paper to directly measure the electric resistance. Alternatively, the surface potential of the photosensitive body or the intermediate transfer body after paper transfer is measured to estimate the resistance of the sheet of recording paper, based on the surface potential.

(a-4) Developing Agent Characteristics

The characteristics of a developing agent (toner carrier) in the apparatus have a major effect on the functioning of an electronic photographing process. Therefore, the characteristics of the developing agent serve as an important factor for an operation or an output of the system. It is very important to obtain the information about the developing agent. The characteristics of the developing agent are given below.

With respect to a toner, charge amounts, a distribution of charge amounts, fluidity, a degree of agglutination, dimensional concentration, an electric resistance, an external additive content, a consumption of external additive or a remaining amount of external additive, fluidity, a toner concentration (mixture ratio of toner and a carrier) are cited.

With respect to a carrier, magnetic characteristics, a coat thickness, an amount of spent, and the like are cited.

It is generally difficult to independently detect the items in the image forming apparatus. Therefore, these items are detected as integrated characteristics. An example method to measure the integrated characteristics of the developing agent is described below.

A test latent image is formed on a photosensitive body and developed under predetermined developing conditions, and a reflection concentration (optical reflectance) of the toner image formed is measured.

A pair of electrodes is arranged in the developing device to measure a relationship between an application voltage and a current (resistance, dielectric constant, or the like).

A coil is arranged in the developing device to measure voltage-current characteristics (inductance).

A level sensor is arranged in the developing device to detect a developing agent capacity. An optical level sensor, an electric capacitance type level sensor, or the like is used as the level sensor.

(a-5) Photosensitive Body Characteristics

Like the developing agent characteristics, the photosensitive body characteristics are closely related to the functioning of an electronic photographing process. A thickness of a photosensitive body, surface characteristics (friction coefficient and unevenness), surface potentials (before and after the processes), surface energy, scattering light, a temperature, a color, a surface position (fluctuation), a linear velocity, a potential attenuation rate, a resistance/capacitance, a surface moisture content, and the like are cited as the pieces of information of the photosensitive body characteristics. Of these items, the following pieces of information can be detected in the image forming apparatus.

A change of the electric capacitance with a change in thickness collates with voltage-current characteristics between a detected current flowing from a charged member to a photosensitive body and a voltage simultaneously applied to the charged member with respect to a dielectric thickness of a predetermined photosensitive body, to thereby calculate a film thickness.

The surface potential and the temperature can be calculated by a conventionally known sensor.

The linear velocity is detected by an encoder fixed to the rotating shaft of the photosensitive body.

Light scattering from the surface of the photosensitive body is detected by a photo-sensor.

(a-6) Electronic Photographing Process State

Formation of a toner image by an electronic photographing scheme is performed in the following order. That is, uniform charging of a photosensitive body, latent image formation (image exposure) by a laser beam or the like, developing by a charged toner (color particles), transfer of the toner image to a transfer material (for a color image, overlapping on a recording medium serving as an intermediate transfer body or a final transfer material or overlapping developing on the photosensitive body in developing is performed), and fixing of the toner image to the recording medium. Various pieces of information about these stages considerably affect the image and other outputs from the system. It is important to acquire the pieces of information, to evaluate the stability of the system. The following are concrete examples of acquiring the pieces of information of the electronic photographing process state.

A conventionally known surface potential sensor detects a charge potential and a potential of an exposing unit.

A gap between a charged member and a photosensitive body in non-contact charging is detected by measuring an amount of light caused to pass through the gap.

A wide-band antenna captures an electromagnetic wave generated by charging.

Sound generated by charging

Exposure strength

Wavelength of exposure light

The following are methods of acquiring various states of a toner image.

To calculate a pile height (height of a toner image), a displacement sensor calculates a depth in the vertical direction, and a linear sensor for parallel beams measures a light-shielding length in the horizontal direction.

A toner charge amount is calculated by a ratio of a potential of an electrostatic latent image of an all-overlaying portion to an amount of adhesion which is measured by a potential sensor that measures a potential in a developing state of the latent image and which is converted from a reflection concentration sensor at the same position.

A dot fluctuation or a dot gap is calculated by the following method. An infrared area sensor detects a dot pattern image on a photosensitive body. An area sensor that has wavelengths depending on colors on an intermediate transfer body detects the dot pattern, and an appropriate process is performed.

To calculate an amount of offset (after fixing), the corresponding positions on a sheet of recording paper and a fixing roller are read out by an optical sensor and compared with each other.

An optical sensor is installed after the transfer process (on a PD or on a belt), and a remaining amount of transfer is decided by an amount of reflected light from a transfer remaining pattern obtained after a specific pattern is transferred.

Color unevenness in overlapping is detected by a full-color sensor that detects a fixed image on the sheet of recording paper.

(a-7) Characteristic of Toner Image Formed

An image concentration and a color are optically detected (Any one of a reflectance and a transmittance may be used. A projecting wavelength is selected depending on a color). A concentration and monochromatic information may be obtained on a photosensitive body or an intermediate transfer body. However, a combination of colors such as color unevenness must be measured on a sheet of paper.

To calculate tone property, an optical sensor reflection detects concentration of toner images formed on a photosensitive body at tone levels or toner images transferred to a transfer body.

What is claimed is:

1. A variable focal length lens comprising:
    a first group optical system having a negative refracting power, a second group optical system having a positive refracting power, and a third group optical system having a positive refracting power, wherein the first through the third group optical systems are sequentially arranged from an object side; and
    a stop provided on the object side of the second group optical system and that moves integrally with the second group optical system, wherein
    a focal length is changed by changing distances between the first through the third group optical systems and when performing focusing the third group optical system is moved along an optical axis,
    the first group optical system includes a negative meniscus lens, a negative meniscus lens, and a positive lens those are sequentially arranged from the object side, at least one surface of the two negative meniscus lenses being an aspherical surface,
    the second group optical system includes a cemented lens of a positive lens and a negative lens, a positive lens, and a positive lens those are sequentially arranged from the object side, a surface on the object side of the positive lens on the most object side being an aspherical surface, and
    the third group optical system includes one positive lens not including an aspherical surface.

2. The variable focal length lens according to claim 1, wherein the positive lens of the third group optical system is a positive meniscus lens.

3. The variable focal length lens according to claim 2, wherein when R1 is a radius of curvature a surface on an object side of the positive lens of the third group optical system, and R2 is a radius of curvature of a surface on an image side of the positive lens of the third group optical system, then the relation $$-0.75 < \{(R1-R2)/(R1+R2)\} < -0.65$$

holds true.

4. The variable focal length lens according to claim 1, wherein when D23w is a distance between the second group optical system and the third group optical system at the wide-angle end, fw is a focal length of all the systems at the wide-angle end, and f3 is a focal length of the third group optical system, then the relation $$1.5 < \{(D23w \times f3)/fw^2\} < 2.5$$

holds true.

5. A variable focal length lens comprising:
    a first group optical system having a negative refracting power, a second group optical system having a positive refracting power, and a third group optical system having a positive refracting power, wherein the first through the third group optical systems are sequentially arranged from an object side; and
    a stop provided on the object side of the second group optical system and that moves integrally with the second group optical system, wherein
    a focal length is changed by changing relative distances between the first through the third group optical systems and when performing focusing the third group optical system is moved along an optical axis, the first group optical system includes a negative meniscus lens, a negative meniscus lens, and a positive lens those are sequentially arranged from the object side, the second group optical system includes a cemented lens of a positive lens and a negative lens, a positive lens, and a positive lens those are sequentially arranged from the object side, the third group optical system includes one positive lens, at least one surface of the negative meniscus lens in the first group optical system and a surface on the most object side in the second group optical system being aspherical surfaces, and the third group optical system includes only a spherical lens.

6. The variable focal length lens according to claim 5, wherein the positive lens of the third group optical system is a positive meniscus lens.

7. The variable focal length lens according to claim 6, wherein when R1 is a radius of curvature a surface on an object side of the positive lens of the third group optical system, and R2 is a radius of curvature of a surface on an image side of the positive lens of the third group optical system, then the relation

−0.75<{(R1−R2)/(R1+R2)}<−0.65 holds true.

8. The variable focal length lens according to claim 5, wherein when D23w is a distance between the second group optical system and the third group optical system at the wide-angle end, fw is a focal length of all the systems at the wide-angle end, and f3 is a focal length of the third group optical system, then the relation 1.5<{(D23w×f3)/fw$^2$}<2.5 holds true.

9. A photographing lens unit comprising a variable focal length lens as an optical system, the variable focal length lens including a first group optical system having a negative refracting power, a second group optical system having a positive refracting power, and a third group optical system having a positive refracting power, wherein the first through the third group optical systems are sequentially arranged from an object side; and a stop provided on the object side of the second group optical system and that moves integrally with the second group optical system, wherein a focal length is changed by changing distances between the first through the third group optical systems and when performing focusing the third group optical system is moved along an optical axis, the first group optical system includes a negative meniscus lens, a negative meniscus lens, and a positive lens those are sequentially arranged from the object side, at least one surface of the two negative meniscus lenses being an aspherical surface, the second group optical system includes a cemented lens of a positive lens and a negative lens, a positive lens, and a positive lens those are sequentially arranged from the object side, a surface on the object side of the positive lens on the most object side being an aspherical surface, and the third group optical system includes one positive lens not including an aspherical surface.

10. A photographing lens unit comprising a variable focal length lens as an optical system, the variable focal length lens including a first group optical system having a negative refracting power, a second group optical system having a positive refracting power, and a third group optical system having a positive refracting power, wherein the first through the third group optical systems are sequentially arranged from an object side; and a stop provided on the object side of the second group optical system and that moves integrally with the second group optical system, wherein a focal length is changed by changing relative distances between the first through the third group optical systems and when performing focusing the third group optical system is moved along an optical axis, the first group optical system includes a negative meniscus lens, a negative meniscus lens, and a positive lens those are sequentially arranged from the object side, the second group optical system includes a cemented lens of a positive lens and a negative lens, a positive lens, and a positive lens those are sequentially arranged from the object side, the third group optical system includes one positive lens, at least one surface of the negative meniscus lens in the first group optical system and a surface on the most object side in the second group optical system being aspherical surfaces, and the third group optical system includes only a spherical lens.

11. A camera comprising a variable focal length lens as a photographing optical system, the variable focal length lens including a first group optical system having a negative refracting power, a second group optical system having a positive refracting power, and a third group optical system having a positive refracting power, wherein the first through the third group optical systems are sequentially arranged from an object side; and a stop provided on the object side of the second group optical system and that moves integrally with the second group optical system, wherein a focal length is changed by changing distances between the first through the third group optical systems and when performing focusing the third group optical system is moved along an optical axis, the first group optical system includes a negative meniscus lens, a negative meniscus lens, and a positive lens those are sequentially arranged from the object side, at least one surface of the two negative meniscus lenses being an aspherical surface, the second group optical system includes a cemented lens of a positive lens and a negative lens, a positive lens, and a positive lens those are sequentially arranged from the object side, a surface on the object side of the positive lens on the most object side being an aspherical surface, and the third group optical system includes one positive lens not including an aspherical surface.

12. A camera comprising a variable focal length lens as a photographing optical system, the variable focal length lens including a first group optical system having a negative refracting power, a second group optical system having a positive refracting power, and a third group optical system having a positive refracting power, wherein the first through the third group optical systems are sequentially arranged from an object side; and a stop provided on the object side of the second group optical system and that moves integrally with the second group optical system, wherein a focal length is changed by changing relative distances between the first through the third group optical systems and when performing focusing the third group optical system is moved along an optical axis, the first group optical system includes a negative meniscus lens, a negative meniscus lens, and a positive lens those are sequentially arranged from the object side, the second group optical system includes a cemented lens of a positive lens and a negative lens, a positive lens, and a positive lens those are sequentially arranged from the object side, the third group optical system includes one positive lens, at least one surface of the negative meniscus lens in the first group optical system and a surface on the most object side in the second group optical system being aspherical surfaces, and the third group optical system includes only a spherical lens.

13. A portable information terminal device comprising a variable focal length lens as a photographing optical system of a camera function unit, the variable focal length lens including a first group optical system having a negative refracting power, a second group optical system having a positive refracting power, and a third group optical system having a positive refracting power, wherein the first through the third group optical systems are sequentially arranged from an object side; and a stop provided on the object side of the second group optical system and that moves integrally with the second group optical system, wherein a focal length is changed by changing distances between the first through the third group optical systems and when performing focusing the third group optical system is moved along an optical axis, the first group optical system includes a negative meniscus lens, a negative meniscus lens, and a positive lens those are sequentially arranged from the object side, at least one surface of the two negative meniscus lenses being an aspherical surface, the second group optical system includes a cemented lens of a positive lens and a negative lens, a positive lens, and a positive lens those are sequentially arranged from the object side, a surface on the object side of the positive lens on the most object side being an aspherical surface, and the third group optical system includes one positive lens not including an aspherical surface.

14. A portable information terminal device comprising a variable focal length lens as a photographing optical system of a camera function unit, the variable focal length lens including a first group optical system having a negative refracting power, a second group optical system having a positive refracting power, and a third group optical system having a positive refracting power, wherein the first through the third group optical systems are sequentially arranged from an object side; and a stop provided on the object side of the second group optical system and that moves integrally with the second group optical system, wherein a focal length is changed by changing relative distances between the first through the third group optical systems and when performing focusing the third group optical system is moved along an optical axis, the first group optical system includes a negative meniscus lens, a negative meniscus lens, and a positive lens those are sequentially arranged from the object side, the second group optical system includes a cemented lens of a positive lens and a negative lens, a positive lens, and a positive lens those are sequentially arranged from the object side, the third group optical system includes one positive lens, at least one surface of the negative meniscus lens in the first group optical system and a surface on the most object side in the second group optical system being aspherical surfaces, and the third group optical system includes only a spherical lens.

* * * * *